Dec. 5, 1967  T. ZEIS ET AL  3,356,269

ADJUSTABLE ROTOR-JIGGER

Filed Aug. 1, 1966  2 Sheets-Sheet 1

INVENTORS:
THEODORE NICOLAS ZEIS
AND MARTHA ZEIS
BY: *Cavanagh & Norman*

Dec. 5, 1967  T. ZEIS ETAL  3,356,269
ADJUSTABLE ROTOR-JIGGER
Filed Aug. 1, 1966  2 Sheets-Sheet 2
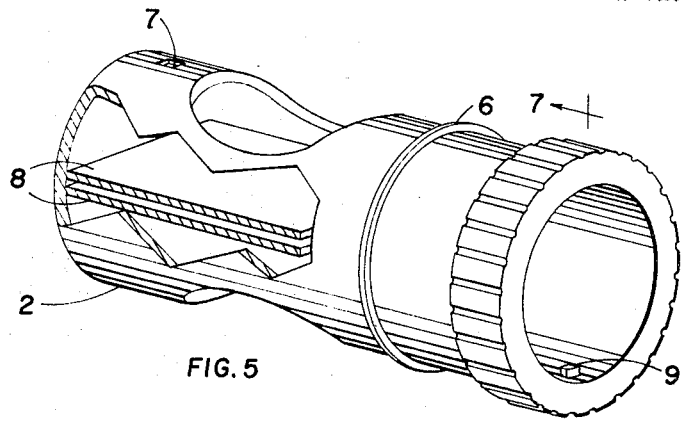
FIG. 5
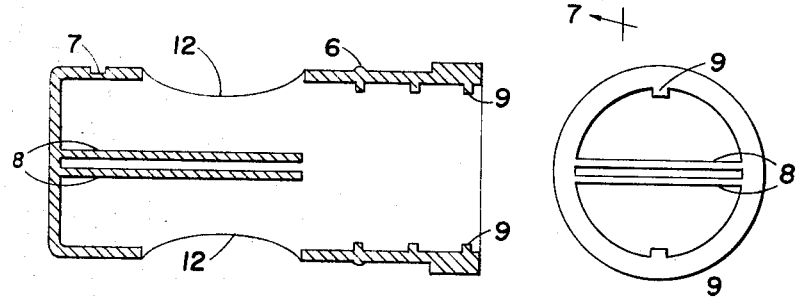
FIG. 7  FIG. 6
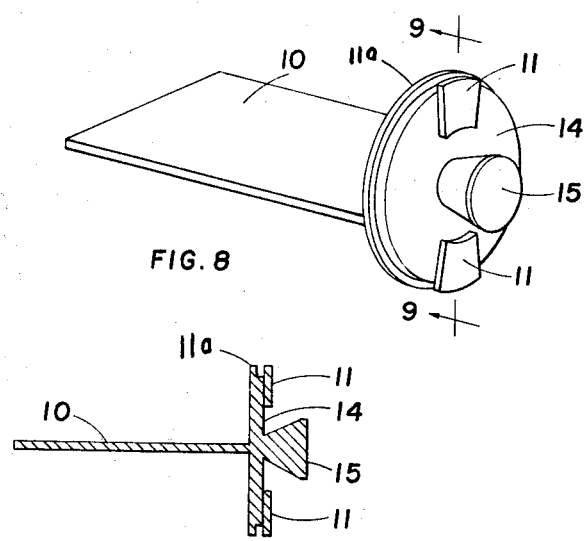
FIG. 8
FIG. 9
INVENTORS:
THEODORE NICOLAS ZEIS
AND MARTHA ZEIS
BY: *Cavanagh & Norman*

United States Patent Office 3,356,269
Patented Dec. 5, 1967

3,356,269
ADJUSTABLE ROTOR-JIGGER
Theodore Zeis and Martha Zeis, both of 856 Plymouth Ave., Apt. 331, Montreal 16, Quebec, Canada
Filed Aug. 1, 1966, Ser. No. 569,224
3 Claims. (Cl. 222—307)

ABSTRACT OF THE DISCLOSURE

This specification discloses an adjustable rotor-jigger for dispensing measured quantities of a liquid with the device comprising three main parts. These are: a hollow cylindrical body having diametrically opposed openings with a mouthpiece carried by the body and communicating with one of the openings; a cylindrical cup rotatably mounted in the body and having diametrically opposed openings adapted to align with the openings in the body with the cup having an open end and a closed end from which extends into the cup, a pair of divider plates; and a plate like closure for the open end carrying a divider plate that cooperates with said pair of divider plates to divide the cup into two semicylindrical chambers with the closure assuming any of several adjusted positions in the cup to provide a desired capacity in the chambers.

---

This invention relates to a device for dispensing predetermined quantities of liquid. More specifically, this invention relates to an adjustable jigger for dispensing liquids from a container.

Previous devices in this field suffer from the disadvantages either of not being adjustable or, when adjustable, of not being adjustable to dispense predetermined quantities. Another disadvantage of the previous devices is that they are subject to spilling, which makes them difficult to handle in general and not too useful in dispensing accurate amounts of liquid.

It is therefore an object of the present invention to provide a dispensing device which is adjustable as to the amount of liquid it dispenses.

It is a further object of this invention to provide a dispensing device which is substantially spill-proof.

A feature of the inventive dispenser is its capacity to receive a second volume of liquid while the first one is being dispensed.

The invention achieves the foregoing objects and others which will be obvious from or appear in the description of the preferred embodiment by providing a device for measuring and dispensing liquid from a container comprising: a hollow cylindrical cup, having two openings spaced diametrically opposite each other in the sides thereof, and having first divider means extending from the closed end thereof; a divider cover adapted to be inserted into the open end of said cup to provide thereby two separate enclosed chambers within said cup, said cover comprising a plate member, adapted to closingly engage the inner surface of said cylindrical cup at spaced intervals therealong adjacent one end whereby to permit predetermined adjustments of the volumes of said chambers, and further comprising a divider member extending from said plate member into said cup and engaging said first divider means; a hollow cylindrical body adapted to rotatably receive said cup, said body having an opening in the side thereof and a mouthpiece extending from said body and spaced diametrically opposite to said opening in said body, said mouthpiece being adapted to be received by said container; the holes in said cup being adapted to register with the hole and mouthpiece in said body, whereby liquid dispensed from said container through said mouthpiece will be received by the chamber adjacent said mouthpiece and whereby, upon 180° rotation of said cup within said body, a measured volume of liquid will be dispensed from the filled chamber while the empty chamber will be in position adjacent said mouthpiece to receive a further measured volume of liquid.

Figure 1:
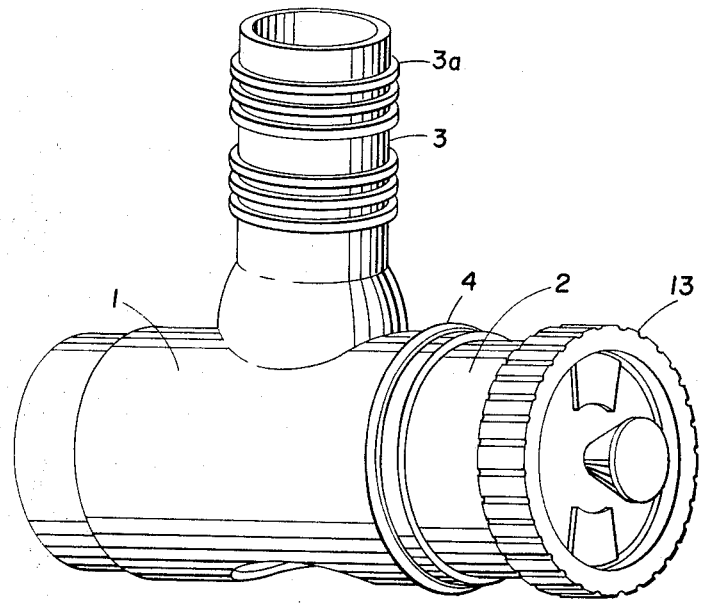
Figure 2:
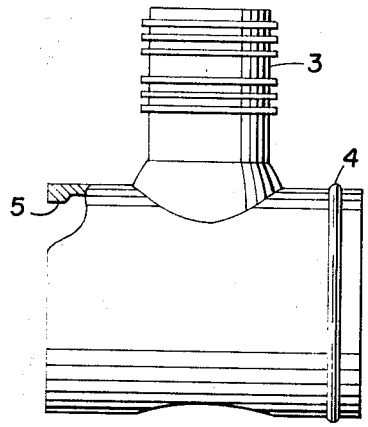
Figure 3:
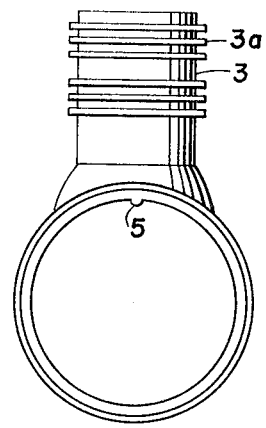
Figure 4:
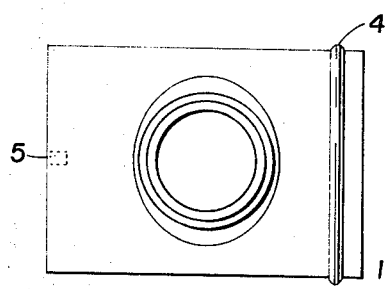

In the drawings:
FIGURE 1 is a perspective view of the dispensing device;
FIGURE 2 is a side view of the cylindrical body forming part of the dispensing device;
FIGURE 3 is an end view of the cylindrical body;
FIGURE 4 is a top view of the cylindrical body;
FIGURE 5 is a perspective view of the cup member forming part of the dispensing device;
FIGURE 6 is an end view of the cup member;
FIGURE 7 is a sectional view taken along the line 7—7 of FIGURE 5;
FIGURE 8 is a perspective view of the divider member; and
FIGURE 9 is a sectional view taken along the line 9—9 of FIGURE 8.

The dispensing device illustrated in FIGURE 1 comprises a hollow cylindrical body 1 having a cup member 2 inserted therein. The cup is manually rotatable in the cylinder and is held in position in the cylinder by the engagement of male bead 6 (shown in FIGURE 5) with female bead 4.

As can be seen in FIGURE 2 the cylindrical body has a mouthpiece 3 extending from a side thereof and an opening in its side spaced diametrically opposite to the mouthpiece. The mouthpiece 3 is provided with resilient annular rings 3a to engage the inner surface of the mouth of the container (not shown) thus providing a gripping action to insure firm attachment of the dispenser to the container.

The cup member (see FIGURES 5, 6 and 7) has divider means in the form of plates 8 extending from the closed end thereof. In the preferred embodiment, two extensions are shown as is seen in FIGURE 7; however, it is within the scope of the invention to provide only one extension or more than two extensions on the cup member.

Spaced annular internal beads 9 projecting into the bore of the cup are provided adjacent the open end of the cup, and diametrically opposed openings 12 are provided in the cylindrical wall of the cup for the introduction of liquid thereto.

In the preferred embodiment, two diametrically opposed external notches 7 are provided adjacent to the closed end of the cup to engage one at a time the resilient protrusion or detent 5 (see FIGURES 2, 3 and 4) of the cylindrical body when one of the openings of the cup is aligned with the opening in the cylindrical body and the other opening is aligned with the mouthpiece 3. The notch and protrusion combination serve the dual purpose of indicating when rotation of the cup should be discontinued in order to insure alignment of one of the openings in the cup with the opening in the cylindrical body and the other opening in the cup with the mouthpiece on the cylindrical body, and of retaining the cup in place when the openings are aligned.

The cup may also be provided with finger-griping means 13 on its surface adjacent its open end as is shown in FIGURES 1 and 5.

The adjustable divider cover, shown in FIGURES 8 and 9, comprises a closure plate 14 with a divider member 10 extending from one side of the plate. Although in the preferred embodiment there is only one such extension, it is within the scope of the invention to have the plate provided with two or more such extensions. Finger-gripping means 15 may be provided on the side of the plate opposite to the extension as is shown in FIGURE 8. Retaining means 11 and 11a extend from the end of the plate and are adapted to engage with annular beads 9 of the cup member.

In operation, the divider cover is inserted into the cup so that the divider member 10 is received in the space between the spaced divider means 8 of the cup member thus defining two separate enclosed chambers within the cup. The retaining means 11 and 11a of the divider cover engage one of the annular beads 9 of the cup member, the annular beads being so spaced as to provide a predetermined volume in the enclosed chamber when the plate covers the open end of the cup. Thus, when the retaining means engages the bead at the extreme right in FIGURE 7, the volume of the enclosed cup is greater than when the retaining means engages the bead at the extreme left. When the jigger is used to dispense liquor, these volumes can be made to correspond to desired volumes of liquor.

The cup is then inserted into the cylindrical body 1, as shown in FIGURE 1, until male bead 6 engages female bead 4, and the cup is then manually rotated until the protrusion 5 falls into the notch 7. As the notch and protrusion are so arranged that one of the openings in the cup is now aligned with the mouthpiece, a clear passage is now provided through the mouthpiece into one of the chambers in the cup.

The mouthpiece of the receptacle is then inserted into the opening of the container (not shown) in such a manner that the annular rings engage the inner walls of the opening of the container to provide a rigid attachment of the device to the container.

When the container is turned end on end, the liquid will flow to fill the chamber adjacent the mouthpiece. When this chamber is filled, the cup is rotated through 180°, that is, till protrusion 5 falls into the second notch 7. As the opening in the filled chamber is now in alignment with the opening at the bottom of the receptacle, the liquid will be dispensed from the device. At the same time, liquid will flow from the container into the empty chamber so that the device will be storing a measured volume while it is dispensing a measured volume.

Conveniently, all parts of the dispenser can be made of plastic material, although other suitable materials can of course be used if desired.

While the invention has been described in detail in the foregoing example, the embodiments disclosed are by way of illustration only and not meant to be restrictive.

Various modifications which will readily suggest themselves to one skilled in the art, are all considered to be within the broad scope of the invention.

The embodiments of the invention in which an exclusive property or privilege is claimed are defined as follows:

1. An adjustable rotor-jigger for dispensing measured quantities of liquid from a container having a discharge opening, said jigger comprising: a hollow cylindrical body open at its opposite ends and formed with a pair of diametrically opposed openings; a mouthpiece carried by said body, communicating with one of said openings and projecting from said body in a direction normal to the axis thereof; means on said mouthpiece for establishing a fluid-tight seal with the container at said discharge opening; a female bead on said body at one of said open ends; a detent carried by said body at the other of said open ends; a cylindrical cup rotatable in said body and having a closed end, a cylindrical wall with a bore, and an open end; said cylindrical wall having a pair of diametrically opposed openings adapted to align with the openings in said body, a pair of external notches in said cylindrical wall adjacent to said closed end; a plurality of spaced apart internal beads carried by said cylindrical wall adjacent to the open end and projecting into said bore; an external bead on said cylindrical wall spaced from the open end and engaging in said female bead to position the cup in the body; a pair of spaced divider plates carried by said closed end and extending into the interior of said cup; a closure plate adjustably positioned in said bore at said open end, a divider member carried by said closure plate and received between said pair of divider plates to divide said cup into two semicylindrical chambers; retaining means on said closure plate cooperating with said internal beads to position said closure plate in said bore; a handle on the outer face of said closure plate; and finger gripping means on the periphery of said cup; said body, cup and closure plate being of a plastic material.

2. The adjustable rotor-jigger of claim 1 in which the means for establishing a fluid-tight seal takes the form of a plurality of spaced apart resilient rings on said mouthpiece.

3. The adjustable rotor-jigger of claim 1 in which the retaining means comprises a pair of diametrically opposed members carried by the closure plate and cooperating with the latter to define channels receiving one of said internal beads.

References Cited

UNITED STATES PATENTS

| | | | |
|---|---|---|---|
| 1,869,120 | 7/1932 | Thoeming et al. | 222—368 X |
| 2,097,503 | 11/1937 | Weeg | 222—304 |
| 2,176,222 | 10/1939 | McGowan | 22—304 |
| 2,579,549 | 12/1951 | Cave | 222—363 X |
| 2,779,512 | 1/1957 | Steele et al. | 222—307 |
| 3,020,941 | 2/1962 | Corley | 22—363 X |

FOREIGN PATENTS

| | | |
|---|---|---|
| 1,155 | 1908 | Great Britain. |
| 653,023 | 5/1951 | Great Britain. |

SAMUEL F. COLEMAN, *Primary Examiner.*